United States Patent Office
3,005,617
Patented Oct. 24, 1961

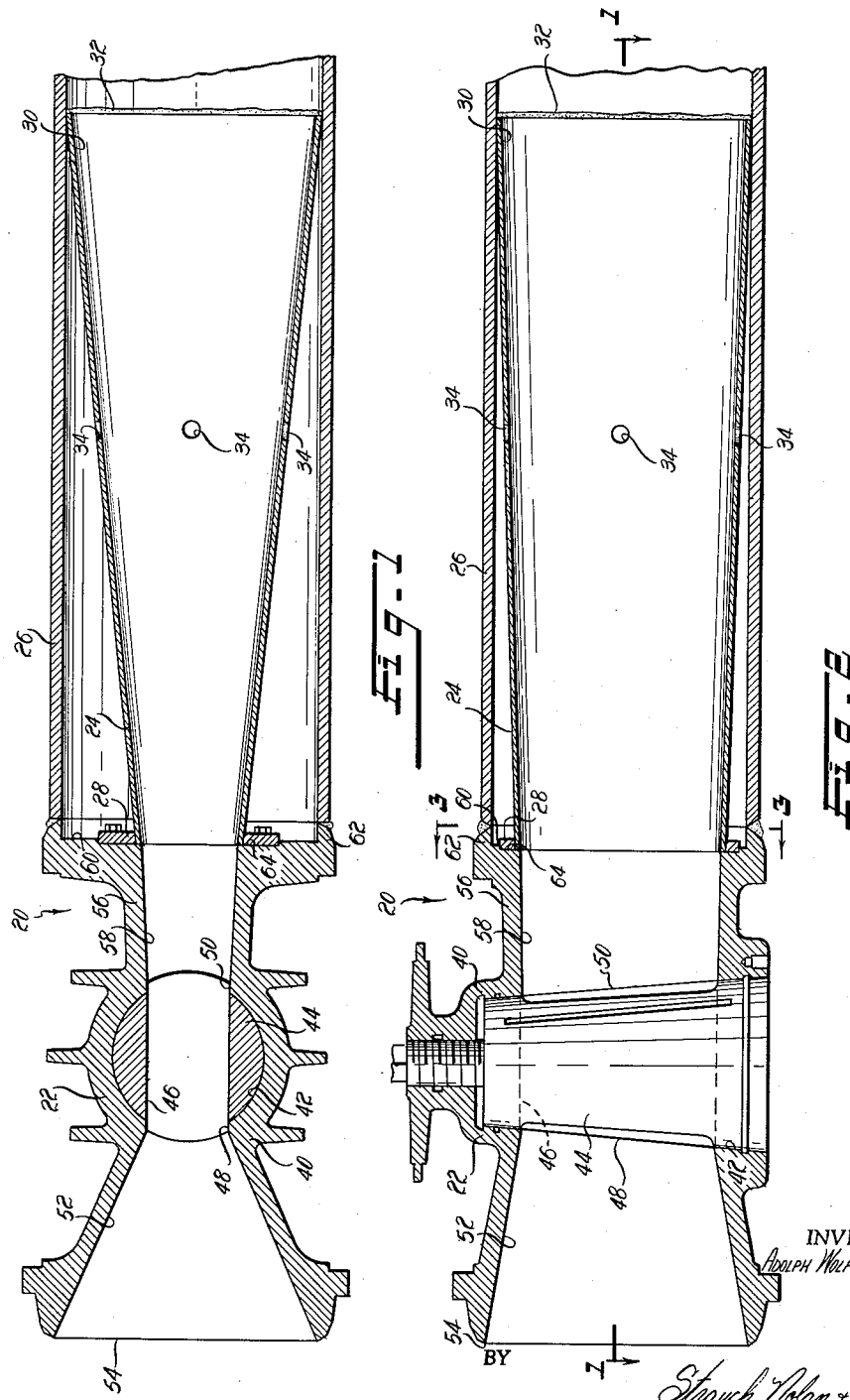

3,005,617
PLUG VALVE
Adolph Wolfensperger, Oakland, Calif., assignor to Rockwell Manufacturing Company, Pittsburgh, Pa., a corporation of Pennsylvania
Filed Nov. 29, 1957, Ser. No. 699,647
11 Claims. (Cl. 251—124)

This invention relates to valves and, more particularly to relatively short plug valve and recovery tube assemblies particularly in which a double angle of divergence is provided in the pressure recovery passage.

Pipe line transportation is today a major carrier of petroleum products and is also expanding rapidly into other fields including that of transporting solids in liquid. Accordingly, to accommodate increasing traffic volume, capacities of such pipelines are continually being increased, primarily by increasing the diameter of the pipeline. Valves used to control the flow through these pipelines, as is to be expected, directly and substantially affect the initial cost and efficient operating cost of such pipelines.

One major type of valve employed in the control of flow in these pipelines is the tapered plug valve which conventionally creates a flow line reduction with a subsequent relatively abrupt enlargement of flow area from the plug port to the downstream valve body outlet and connecting pipeline. Such a formation, particularly where high velocities are present, necessarily results in a rather severe pressure drop in the pipeline at the downstream side of the valve which becomes cumulative in long pipeline incorporating a large number of valves.

This undesirable pressure drop can be held to a minimum or even avoided by using larger tapered plug valves with plug ports having the same or approximately the same cross-sectional area as the pipeline but the increased cost for such large valves is exorbitant. Because of this, and the desire to use the highly advantageous features of tapered plug valves, special recovery passage constructions have been recently proposed to obtain a venturi-like pressure recovery from the valve plug port to the full pipeline diameter downstream of the valve, as exemplified by United States Patents Nos. 2,717,758, 2,747,831, 2,799,467 and 2,799,468.

All the aforementioned recent teachings of plug valves with pressure recovery tubes disclose and rely upon "single" angle recovery tubes, providing a single straight expansion from the valve plug outlet port area to the downstream pipeline area. Prior art teachings have stressed that the recovery tube, particularly in horizontal plan should have an included angle of approximately ten (10) degrees, a compromise between assembly length and efficiency. Test results show that overall efficiencies of a valve assembly with single angle recovery of ten (10) degrees are within an approximate range of 86 to 88 percent depending on the installation. Such efficiencies are good but the resultant length of the valve assembly, necessitated by the ten (10) degree single angle recovery passage, is so extensive as to often hinder efficient design of many installations and to add a considerable amount to the cost of production by way of increased material necessary in construction of the valve assembly.

Accordingly, a primary object of this invention resides in the provision of a novel valve and double angle pressure recovery assembly with overall assembly length shorter than single angle pressure recovery tube assemblies with equivalent efficiencies or with higher recovery efficiencies than single angle pressure recovery tube assemblies with equivalent lengths.

Another object resides in the provision of highly efficient novel pressure recovery plug valve assemblies with shorter overall lengths than those heretofore known.

A further object resides in the provision of a novel pressure recovery passage on the downstream side of a venturi type plug valve, the passage consisting of at least two successive aligned sections the first section having a divergence, the maximum included angle of which has an optimum value of between six (6) and eight (8) degrees, and the length of which is preferably from 10 to 30 percent of the total length of recovery passage and the second section having a divergence, the maximum included angle of which is at least twelve (12) degrees.

Still another object resides in providing a valve with a novel pressure recovery passage formed in a manner to most efficiently and effectively utilize the increased velocity through the valve plug port to produce a pressure recovery downstream of the valve.

A still further object resides in providing for a plug valve, a novel pressure recovery passage structure with at least two successive sections of straight divergence, the first section adjacent the valve plug portion having a relatively low maximum included angle of divergence and the second section immediately succeeding the first section having a maximum included angle of divergence of at least four (4) degrees greater than the first section, the first section comprising the valve body outlet immediately adjacent the plug.

Another object resides in the provision of a novel pressure recovery valve assembly which permits the use of valves of smaller rated size than the pipe line in which they are installed with at least the same efficiency of, and having an assembly length no greater than that required for, a prior art form of single angle pressure recovery valve assembly with a valve of the rated size of the pipe line.

A further object resides in providing a novel pressure recovery valve assembly which has multiple sections of downstream recovery passage with successively increased maximum angles of divergence.

A still further object resides in providing a novel, relatively short pressure recovery valve assembly with multiple sections of downstream recovery passage with successively increased angles of divergence, the initial section of which has at least its entry portion formed integral within the downstream portion of the valve plug port.

Still another object resides in providing a novel, relatively short pressure recovery valve component for use with a divergent pressure recovery tube, the valve outlet passage being divergent from a position within and coextensive with the downstream portion of the valve plug port. In connection with this object it is also an object to provide a novel valve body and plug arrangement wherein only an intermediate portion of the valve plug port defines the minimum cross-sectional area of the valve.

Further novel features and other objects of this invention will become apparent from the following detailed description, discussion and the appended claims taken in conjunction with the accompanying drawings showing preferred structures and embodiments, in which:

FIGURE 1 is a longitudinal sectional plan view, taken on line 1—1 of FIGURE 2, of a pipeline installation of a plug valve and recovery tube assembly embodying the double angle recovery passage concepts of the present invention;

FIGURE 2 is a longitudinal sectional side elevation view corresponding to FIGURE 1;

Figure 3:
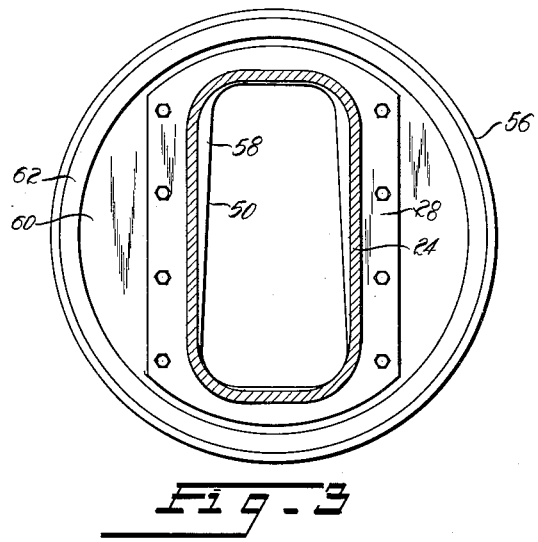
FIGURE 3 is an enlarged section view taken on line 3—3 of FIGURE 2 illustrating the recovery tube end flange and the compound angular divergence of the plug valve casing outlet passage.
Figure 4:
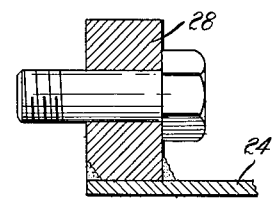
FIGURE 4 is an enlarged detail view of the recovery tube attaching flange.
Figure 5:
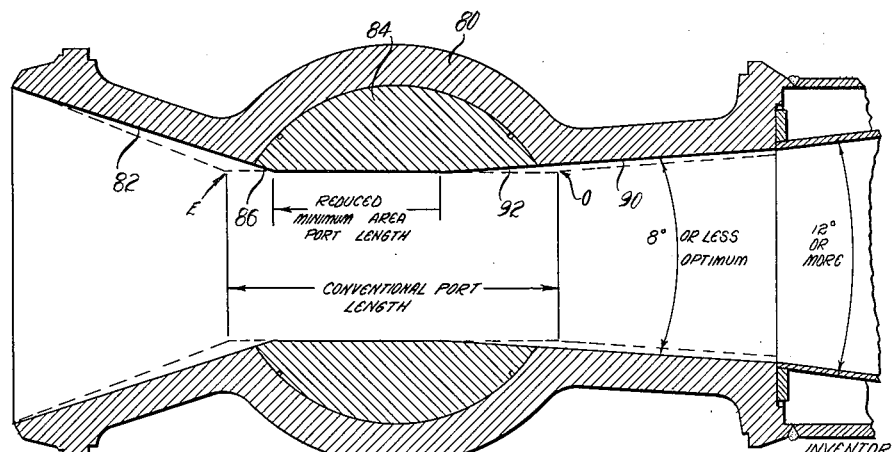
Figure 6:
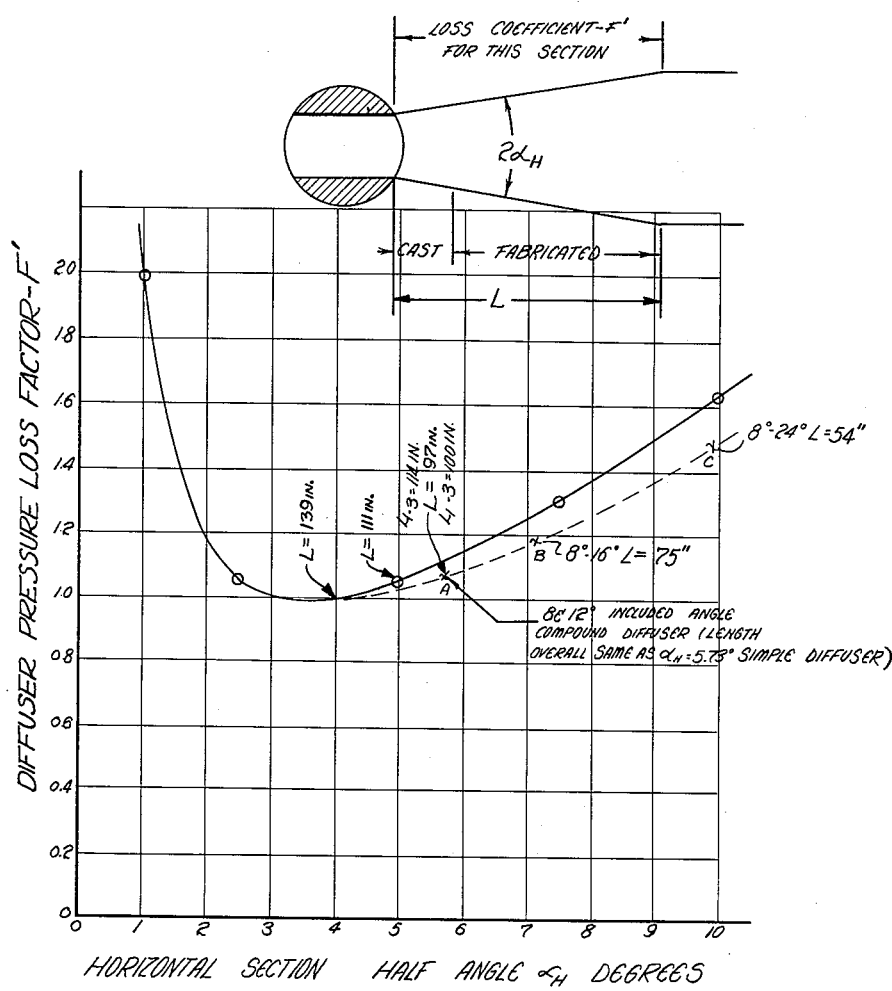

FIGURE 5 is a portion of a horizontal section through a modified plug valve in which a portion of the valve body inlet passage and of the initial section of divergent recovery passage is incorporated in the valve plug to enable a shorter overall unit length; and FIGURE 6 is a graph illustrating comparative pressure losses through (1) single angle recovery tubes and (2) double angle recovery tubes of equal lengths.

With specific reference now to the drawings, the exemplary pressure recovery tube and valve assembly 20 includes a form of venturi valve 22 with a pressure recovery tube section 24 attached to the outlet opening (downstream end) of the valve body. In general, the recovery tube section and the venturi outlet portion of the valve body guide the flow of fluid in transition from the reduced port opening of the valve plug to the full circular cross section of the downstream pipe 26, resulting in a highly efficient recovery of pressure energy in the flowing stream.

Use of a recovery tube section 24, aligned with a recovery entry portion in the valve body requires a specially designed body, to which the tube section 24 is bolted by means of a welded flange 28. The downstream section of pipeline 26 can be welded directly to the valve body and surrounds the tube section 24. The outlet end 30 of the tube section 24 may be attached to the interior of the line pipe 26 by a fillet weld 32 all around its periphery and a number of vent holes 34 provided in the recovery tube section so that pressures on both sides of the tube section are equalized. The recovery tube section 24 may be attached in other ways and utilize other means for pressure equalization as for example the construction described and claimed in U.S. Patent No. 2,799,467. Thus the tube section serves only as a flow guide and is not subjected to line pressure forces.

The application of recovery tube principles to a plug valve is normally accomplished by the addition of a recovery tube section to a venturi valve, which is selected to be one or more nominal sizes smaller than the pipeline, with a resulting flow efficiency comparable to a full-sized, venturi valve, without recovery tube, in the same size pipeline. Using a larger size venturi valve, the valve may be full nominal size and addition of a recovery tube will result in an extremely high flow efficiency.

In the embodiment illustrated in FIGURES 1–4, valve 22 is a lubricated plug type, such as that shown in the Nordstrom Patent No. 2,398,444, and includes the valve body 40 having a vertically extending bore formed with an axially tapered seat 42 for the correspondingly tapered valve plug 44. The plug 44, in this instance, is provided with a transverse passage 46 of elongate trapezoidal nature in cross section axially of the plug 44, passage 46 registering at its opposite ends with the similarly vertically elongate inlet and outlet ports 48 and 50, respectively formed in the valve body 40 at diametrically opposite sides of the seat 42, when plug 44 is in its open position as shown in FIGURES 1 and 2. Suitable means for limiting plug rotation and effecting lubricating may be provided, a description thereof not being deemed necessary to a complete disclosure of the present invention.

Valve body 40 at the upstream side is provided with a venturi-form inlet passage 52 leading to port 48. The wall of passage 52 provides a converging transition from a cylindrical outer end 54 to the trapezoidal inlet port 48. The cylindrical outer end 54 enables connection with an upstream pipe section.

The downstream side of the valve body 40 has an integral lateral extension 56 providing a diverging outlet passage 58 leading from outlet port 50. Extension 56 terminates in a circular end face 60 with an axially extended annular peripheral flange 62 to which is welded the end of a downstream pipe section 26. The opening of passage 58 at the extension end face 60 (FIGURE 3) has a shape intermediate the trapezoidal outlet port 50 and the inner circular shape of the downstream pipeline 26. The angle of divergence of passage 58, and tube section 24 shown in FIGURE 1 is taken on a mid-horizontal plane and is designated as the maximum included angle of divergence in this specification and the claims.

Recovery tube section 24 is aligned with passage 58 and its flange 28 is rigidly secured in a recess 64 on valve body end face 60 by bolts or screws. The flange end of recovery tube section has an opening which matches the intermediate shape of the downstream opening of passage 58 at the body extension end face 60 and the tube section 24 diverges from such intermediate shape to its circular end opening 30 which is the same approximate size as the interior of pipeline 26.

In some previously known recovery tube-valve assemblies, the recovery passage started at or adjacent the tapered seat outlet port and diverged to the internal downstream pipeline contour. This divergence at various longitudinal sections, e.g. a horizontal section corresponding to that of FIGURE 1 and a vertical section corresponding to that of FIGURE 2, of the prior art assemblies occurred at a constant included angle. In other words, the prior art recovery passage forms can be generated by a series of straight lines connecting homologous points on the periphery of the body outlet port and the circular opening in the downstream pipe section. The included angle of divergence of the recovery single angle passage according to prior art teachings should be approximately ten (10) degrees at a mid section and this divergence by construction occurs in horizontal section because the tapered plug port is narrowest in its horizontal dimension. Divergence in longitudinal vertical section is always small due to the height of the port approximating the downstream pipeline diameter. If the horizontal section divergence is held to ten (10) degrees, the vertical section divergence will be somewhere in the order of two (2) to three (3) degrees.

Such prior art divergent recovery passages will hereinafter be referred to as single recovery passages as distinguished from recovery passages having successive sections of increased maximum included angle of divergence which are termed double or multi-angle recovery passages and constitute an important part of this present invention.

Tests indicate that single angle recovery passages of ten (10) degrees included angle will result in valve recovery efficiencies in the order of 86–88% depending upon the size of the valve and the pipeline. The maximum recovery passage angle has been increased to twelve (12) degrees and over, however with such an increase in included angle of divergence, the loss in pressure recovery starts to increase and valve efficiency, accordingly, decreases. Experimentation and background history leading to development of the present inventive concepts has shown that where space permits, the maximum recovery angle can be made eight (8) degrees and lower which is attended by increased or similar efficiencies, at least down to about five (5) degrees, over the ten (10) degree angle. The primary drawback over such smaller maximum recovery angles is the enormous length required for the pressure recovery passage which increases material, cost and installation space.

It is known that the pressure loss through a valve is a function of the formula $$P = F \omega \frac{v^2}{2g}$$

with $P$ = pressure loss in p.s.i./ft.$^2$
$F$ = pressure loss coefficient depending on shape and roughness of flow passage
$\omega$ = density of the fluid (62.4 lbs./ft.$^3$—water)
$v$ = velocity of the fluid It is evident that if F would be a constant value over the entire length of a diffuser or recovery passage, the loss would be a function of $v^2$, which means that in a recovery tube most of the loss is at the beginning where the cross sectional area is smallest and the velocity highest.

In recovery passage valve assemblies, of course, the smallest area occurs in the plug passage and this area is most conventionally the same as the entry port to the divergent recovery passage. In recovery passage valves known to applicant, the relationship of plug port area to the downstream pipe area results in a velocity ratio somewhere in the order of 3.6:1. Pressure loss at the small area valve port is therefore 3.6 squared, or almost 13 times higher per unit length than at the outlet end of the recovery passage. This information leads to at least two considerations.

(a) The length of the valve port section which is of smallest area must be as short as practically possible.

(b) In accord with recognized diffuser theory, the maximum divergence of the walls of at least the entry portion of the recovery tube must be low to enable a high diffuser efficiency.

The overall pressure loss factors of single angle recovery tubes (diffusers) are indicated by the solid line in the graph of FIGURE 6 representing recovery passage pressure loss factor against half angles of divergence of 30" x 24" x 30" recovery tube-valve assemblies. The meaning of F' in the graph is most simply stated as the "velocity heads" which are lost in the recovery passage based on the fluid velocity in the pipe. Overall valve and diffuser efficiency and F' are connected by the equation:

$$\eta = 1 - \frac{F'+Z}{\left(\frac{A_2}{A_1}\right)^2 - 1}$$

where
$A_1$ = diffuser entrance area
$A_2$ = diffuser outlet area
$F'$ = diffuser pressure loss factor
$Z$ = valve inlet and port pressure loss factor
$\eta$ = overall efficiency through the complete valve and diffuser assembly Overall pressure loss factors of double angle recovery tubes (diffusers) in 30" x 24" x 30" recovery tube-valve assemblies are indicated by the dotted line in FIGURE 6. Three points, A, B and C on the dotted line, indicate the values of F' for double angle tubes with entry portion and exit portion angles as noted beside each point. Correlation between the curves is provided by equal lengths of the single angle tube and the double angle tube since in single angle tube assemblies the recovery tube length is directly proportional to the mid-horizontal angle of divergence.

These curves show that the advantages of a double angle recovery tube are:

(a) Shorter length with resultant lower cost for the same overall efficiency, and (b) Higher efficiency for equal length.

The exemplary assembly, 30 x 24 x 30 is one for a 30" inlet pipe size, a nominal size 24" venturi valve and a 30" outlet pipe size. In such an assembly each one foot reduction in overall length represents a savings in material in the approximate range of 53–67 pounds.

As indicated by the graph in FIGURE 6, the optimum single recovery tube included angle of divergence is somewhere between six (6) and eight (8) degrees with the prior art preferred ten (10) degree angle being well within acceptable limits. All points F' which are indicated for double angle recovery tubes are based on initial entry portions with a mid-horizontal included angle of divergence of eight (8) degrees and the succeeding section having various mid-horizontal included angles from twelve (12) degrees to twenty-four (24) degrees. It is thus preferable that the range of initial included angles be from 6–8 degrees, although it is possible that such range could be increased to approximately ten (10) degrees without too large a loss in initial efficiencies. To gain sufficient advantage in reduction of recovery passage length for any increase of pressure loss in the second section its maximum angle of divergence should be within the range of twelve (12) to twenty (20) degrees. For a special application, where space consideration must limit the length of the tube, the maximum included angle of the second section could be increased to approximately thirty (30) degrees and the resultant pressure recovery would be acceptable. However it is felt that there will be very few applications with second section maximum angles between 15 and 30 degrees.

The following tabulations of various recovery tube-valve assembly factors from test results and calculations are presented to enable a comparison between a single angle recovery type with a ten (10) degree maximum included angle of divergence and several double angle assemblies according to this invention.

| Valve | Shape | Diffusor | | | | Complete Valve | |
|---|---|---|---|---|---|---|---|
| | | Length, inches | Angle, degrees | Entrance and Port Losses Z | Diffusor Loss F' | Pressure Loss Factor F'+Z | Efficiency $\eta$ |
| 30 x 24 x 30 $\frac{A_2}{A_1}$=3.66 | Single | 111 | 10 | 0.494 | 1.054 | 1.548 | .875 |
| | Dual | 15 and 82 | 8 and 12 | 0.494 | 1.07 | 1.564 | .874 |
| 30 x 30 $\frac{A_2}{A_1}$=2.43 | Single | 98 | 10 | 0.167 | 0.43 | .597 | .878 |
| | Dual | 18 and 67 | 9.4 and 12 | 0.167 | 0.446 | .613 | .875 |
| | Dual | 18 and 71 | 8 and 12 | 0.167 | 0.43 | .597 | .878 |
| 20 x 16 x 20 $\frac{A_2}{A_1}$=3.58 | Single | 73.25 | 10 | 0.399 | 1.194 | 1.593 | .865 |
| | Dual | 11.25 and 54 | 6.1 and 12.3 | 0.399 | 1.149 | 1.548 | .869 |
| | Dual | 11.25 and 54 | 8 and 12 | 0.399 | 1.129 | 1.528 | .870 |

It will be noted that in each case, the double angle recovery passage results in a greatly reduced recovery passage length with valve efficiency comparable to or better than that for a corresponding single angle recovery passage. In the 30 x 30 valve, the entry angle of the double recovery passage was almost 10 degrees and the second angle was twelve degrees, resulting in a slight drop in valve efficiency and a slight increase in pressure loss factor, however, these differences are very small and are accompanied by a decreased recovery passage length of thirteen inches, a considerable savings in material in a thirty inch pipeline installation. If the entry angle of a 30 x 30 valve were made eight degrees, a more efficient initial recovery would result (see FIGURE 6) and the valve efficiency and pressure loss factors would be better than those for the ten (10) degree single recovery passage. In a similar manner, the double angle recovery passage for the 30 x 24 x 30 valve results in a very slight decrease in overall valve assembly efficiency but this slight drop is more than compensated for by the 14" saving in length (which reduces the space required) of the recovery passage.

These tabulations verify that double angle recovery installations in accord with this invention at least approximate, and in many cases will be better than, the valve efficiencies and pressure loss factors of prior art ten (10) degree single recovery installations, and in all cases the total length of the double angle recovery passage will be less than that of the prior art preferred ten (10) degree and the optimum seven (7) degree angle recovery passage.

As previously discussed, a portion of pressure loss thruogh a valve is primarily a result of the high velocity of fluid flow through reduced areas and the smallest cross section area occurs through the actual valving ports in the valve body and plug. FIGURE 5 illustrates a special modification which is proposed by this invention to reduce the length of the valve body and plug port portion of smallest cross sectional area. Valve body 80 is provided with a convergent inlet passage 82 which, when plug 84 is in open position as shown, has a maximum angle of convergence less than that of prior art venturi type plug valves and is aligned with a similarly convergent entry portion 86 of the plug port 88. Thus the smallest cross section area of the flow passage through the valve does not occur within the body inlet passage 82 as is true in conventional prior art valves (indicated by point E on FIGURE 5), but occurs within the plug 84. Similarly the divergence of the outlet passage 90 of valve body 80 is a continuation of a divergence which starts in the downstream portion 92 of the plug port 88 rather than in the body outlet passage as is true in conventional plug valves (point O in FIGURE 5).

In a 30 x 24 x 30 venturi type valve, the average plug port length is approximately fifteen (15) inches and the valve body entry and exit portions adjacent the plug bore, which constitute extensions of the plug port of the same cross sectional area as the port, are approximately one (1) inch each in length. Thus the average total length of the smallest area portion of the valve port is approximately seventeen (17) inches. By including portions of valve body inlet convergence and outlet divergence in the plug port, the length of minimum cross sectional area of the valve body port can be reduced approximately fifty (50) percent. A modification of venturi type valve body and valve plug, as taught by the embodiment described in conjunction with FIGURE 5, will decrease total pressure loss through the valve body port besides decreasing the total assembly length by an amount equal to approximately fifty percent of the length of valve body ports in presently used venturi-type plug valves, and this decrease in length is additive to the decreased length resulting from the double angle recovery passage.

The foregoing description fully discloses the inventive concept of obtaining high efficiencies of pressure recovery through pipeline valve assemblies utilizing a double angle pressure recovery passage and teaches the structural means of obtaining such efficient recovery with shorter overall lengths of recovery tube-valve assemblies than those previously known and used. This highly advantageous accomplishment is the result of utilizing double angle recovery tubes within certain limits of maximum included angles of divergence and also by specific construction of valve body and plug wherein the valve body inlet convergence and outlet divergence are respectively terminated and initiated within the valve plug port rather than at positions in the valve body spaced from the valve plug port.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed and desired to be secured by United States Letters Patent is:

1. A recovery tube and plug valve assembly having valve plug controlled valve ports wherein a recovery tube passage consists of a few successive coextensive portions leading from the valve port of smallest cross-sectional area to a downstream cross-sectional area equivalent to that of a pipeline in which the assembly is adapted to be installed, each of said portions increasing in cross-sectional area at a constant rate, the upstream portion of said recovery passage having a maximum included angle at its horizontal mid-plane no greater than ten degrees and the downstream portion of said recovery passage having a maximum included angle at its horizontal mid-plane of at least twelve degrees, the valve plug having a port with the smallest cross-sectional area occurring at a portion of the plug port offset upstream from the downstream opening of the plug port and the initial portion of the diverging upstream portion of said recovery passage occurring within the valve plug port.

2. A recovery tube valve assembly comprising a valve body having a seating surface therein, a rotatable plug member cooperable with said seating surface and a port extending therethrough, said valve body having a pair of end portions on opposite sides of said port and provided with tapered inlet and outlet passages respectively adapted for registry at the smaller ends thereof with the ends of said port, a tapered tubular pipe section connected at its smaller end to said valve body outlet end portion and its larger end being circular with a cross-sectional area approximately equal to the inner cross-sectional area of a pipeline in which the valve assembly is to be installed, the outlet end opening of said valve body outlet passage and the inlet end opening of said pipe section being substantially identical and equal in cross-sectional area, the maximum included angle of divergence at a mid-horizontal plane of said pipe section being at least twelve degrees and the maximum included angle of divergence at a mid-horizontal plane of said valve body inlet passage being at least five degrees and no more than ten degrees, said valve plug port having its entry portion formed convergently so its walls form a smooth extension of said valve body inlet passage to a position interior of said plug, and said valve plug port having its outlet formed divergently so its walls form a smooth extension of the valve body inlet passage from a position interior of said plug.

3. A recovery tube and plug valve assembly wherein the recovery passage is comprised of a few passage sections with successively increased maximum included angles of divergence, each section having a constant rate of cross-sectional increase in the direction of divergence, and wherein the initial recovery passage section has at least its entry portion formed integral with the downstream portion of the valve plug port.

4. A plug valve and pipeline assembly comprising a valve body having a plug seat therein, a rotatable plug member cooperable with said seating surface and having a port extending therethrough, said body having a pair of end portions on opposite sides of said port and provided with converging inlet passage and diverging constant taper outlet passage respectively adapted for registry at their smaller ends with said plug port, the optimum maximum included angle of divergence of said outlet passage being within the range of six to eight degrees, means at the terminal portions of said end portions for securing pipeline connections, a tubular tapered pipe section of smaller diameter than the pipeline to which said valve body is to be attached having its smaller end secured to the outlet end portion of said valve body to provide a continuation of said valve body outlet passage, the maximum included angle of divergence of said tubular tapered pipe section being located at its mid-horizontal plane and being greater than the maximum included angle of said valve body outlet passage at its mid-horizontal plane and at least twelve degrees and the outlet end of said tubular tapered pipe adapted to fit inside and be secured to the pipeline on the downstream side of said valve body, said plug member port having inlet and outlet portions shaped with a constant taper to conform respectively to the taper of the valve body inlet and outlet whereby the extent of the minimum cross-sectional port area of the plug valve is less than the length of the plug port.

5. In a plug valve assembly, a body formed with a through passage intersected by a tapered bore, a rotatable tapered plug seated in said bore and formed with a through port adapted to align with or block said valve body passage, a cylindrical pipeline section attached to the valve body concentrically of said passage, and a pressure recovery tube extending from the exit end of said passage to merge with the interior of said pipeline section downstream of the valve body, the outlet portion of the valve body passage being formed to diverge from said bore at a predetermined angle, the pressure recovery tube diverging from said exit end of said passage at a materially larger angle, and the outlet end portion of said plug through port having a constant angle of divergence within the approximate range of six to eight degrees, said angles being measured in a plane on the pipeline diameter perpendicular to the axis of said bore.

6. A recovery tube and plug valve assembly having valve plug controlled valve ports of trapezoidal cross-section wherein a recovery tube passage comprises at least two and no more than seven successive coextensive portions leading from the valve port of smallest cross-sectional area to a downstream circular cross-sectional area equivalent to that of a pipeline in which the assembly is adapted to be installed, each of said portions increasing in cross-sectional area at constant angular divergence, the upstream portion of said recovery passage having a maximum included constant angle of divergence at its horizontal mid-plane no greater than ten degrees and the downstream portion of said recovery passage having a maximum included constant angle of divergence at its horizontal mid-plane of at least approximately twelve degrees, the upstream portion of said recovery tube passage being formed wholly within the confines of the body of the plug valve and at least the downstream portion being a tubular pipe secured to said valve body, and the vertical dimensions along a vertical mid-plane of said recovery passage being at least as great at any downstream position in the recovery passage as the vertical recovery passage dimensions upstream of such downstream location and also being of sufficient value to assure, in correlation with horizontal divergence, that each specific successive downstream recovery tube portion has its cross-sectional area increased at a greater rate than that of the immediately adjacent upstream recovery tube portion.

7. A recovery tube valve assembly comprising a valve body having a seating surface therein, a rotatable plug member cooperable with said seating surface and having a port of trapezoidal cross-section extending therethrough, said valve body having a pair of end portions on opposite sides of said port and provided with a tapered inlet passage and straight tapered outlet passage respectively adapted for cross-section area registry at the smaller ends thereof with the trapezoidal cross-section shaped ends of said port, a straight tapered tubular pipe section connected at its smaller end to said valve body outlet end portion, and its larger end being circular with a cross-sectional area approximately equal to the inner cross-sectional area of a pipeline in which the valve assembly is to be installed, said outlet passage and said pipe section providing a recovery passage, the outlet end opening of said valve body outlet passage and the inlet end opening of said pipe section being substantially identical and equal in cross-sectional area, the maximum included angle of straight line divergence at a mid-horizontal plane of said pipe section being at least approximately twelve degrees and the maximum included angle of straight line divergence at a mid-horizontal plane of said valve body outlet passage being at least five degrees and no more than ten degrees, and the vertical dimensions along a vertical mid-plane of said recovery passage being at least as great at any downstream position in the recovery passage as the vertical recovery passage dimensions upstream of such downstream location and also being of sufficient value to assure, in correlation with horizontal divergence, that the cross-sectional area of said pipe section is increased at a greater rate than that of the immediately adjacent upstream valve body outlet passage.

8. A recovery tube valve assembly as defined in claim 7, wherein the length of the valve body outlet passage is within the range of from ten to thirty percent of the combined length of said valve body outlet passage and said tubular pipe section.

9. A plug valve and pipeline assembly comprising a valve body having a plug seat therein, a rotatable plug member cooperable with said seating surface and having a port with trapezoidal cross-section extending therethrough, said body having a pair of end portions on opposite sides of said port and provided with converging inlet passage and diverging constant tapered outlet passage respectively adapted for trapezoidal cross-section area registry at their smaller ends with said plug port, the optimum maximum included angle of divergence of the valve body outlet passage being within the range of six to eight degrees, means at the terminal portions of said end portions for securing pipeline connections, a tubular constant tapered pipe section of smaller diameter than the pipeline to which said valve body is to be attached having its smaller end secured to the outlet end portion of said valve body to provide a continuation of said valve body outlet passage and therewith constituting a recovery passage, the maximum included angle of divergence of said tubular tapered pipe section being located at its mid-horizontal plane and being greater than the maximum included angle of said valve body outlet passage at its mid-horizontal plane and at least approximately twelve degrees, and the vertical dimensions along a vertical mid-plane of said recovery passage being at least as great at any downstream position in the recovery passage as the vertical recovery passage dimensions upstream of such downstream location and also being of sufficient value to assure, in correlation with horizontal divergence, that the cross-sectional area of said tapered pipe section is increased at a greater rate than that of the immediately adjacent upstream valve body outlet passage, the outlet end of said tubular tapered pipe being adapted to fit inside of and be secured to the pipeline on the downstream side of said valve body.

10. In a plug valve assembly, a body formed with a through passage intersected by a tapered bore, a rotatable tapered plug seated in said bore and formed with a trapezoidal cross-section through port adapted to align with or block said valve body passage, a cylindrical pipeline section attached to the valve body concentrically of said valve body passage, a pressure recovery tube section extending from the exit end of said valve body passage to merge with the interior of said pipeline section downstream of the valve body, the outlet portion of the valve body passage being trapezoidal cross-section at its smaller end and formed to diverge from said bore at predetermined constant angularity, the pressure recovery tube diverging from said exit end of said outlet portion at materially larger angularity and together with said outlet portion providing a recovery passage, said outlet portion of the valve body passage having an angle of divergence measured in a plane on the pipeline diameter perpendicular to the axis of said bore within the approximate range of six to eight degrees and said pressure recovery tube having an angle of divergence measured in a plane on the pipeline diameter perpendicular to the axis of said bore of at least approximately twelve degrees, and the vertical dimensions along a vertical mid-plane of said recovery passage being at least as great at any downstream position in the recovery passage as the vertical recovery passage dimensions upstream of such downstream location and also being of sufficient value to assure, in correlation with horizontal divergence, that the cross-sectional area of said tube section is increased at a greater rate than that of the immediately adjacent upstream valve body outlet portion.

11. A recovery tube and plug assembly wherein the recovery passage has an inlet cross-section of trapezoidal shape and a circular outlet and is comprised of at least two and no more than seven passage sections with maximum included angles of divergence successively increased in increments within the approximate range of from two to six degrees, each section having constant angularity of divergence, the initial upstream recovery passage section having a diverging included angle of approximately six degrees measured in the horizontal plane, the vertical dimensions along a vertical mid-plane of said recovery passage being at least as great at any downstream position in the recovery passage as the vertical recovery passage dimensions upstream of such downstream location and also being of such value to assure, in correlation with horizontal divergence, that each specific successive downstream recovery tube section has its cross-sectional area increased at a greater rate than that of the immediately adjacent upstream recovery tube section, and the initial passage section is a structurally integral portion of the outlet end of the body of said valve, with the remainder of said recovery passage being aligned with and secured thereto.

References Cited in the file of this patent

UNITED STATES PATENTS

| | | |
|---|---|---|
| 550,244 | Blagburn | Nov. 26, 1895 |
| 600,453 | Sticker | Mar. 8, 1898 |
| 642,046 | Miller | Jan. 23, 1900 |
| 842,393 | De Ferranti | Jan. 29, 1907 |
| 1,249,601 | De Ferranti | Dec. 11, 1917 |
| 1,924,325 | Kramer | Aug. 29, 1933 |
| 2,717,758 | Van Deventer | Sept. 13, 1955 |
| 2,799,467 | Hedene | July 16, 1957 |
| 2,799,468 | Van Deventer | July 16, 1957 |

FOREIGN PATENTS

| | | |
|---|---|---|
| 135,288 | Switzerland | Nov. 16, 1929 |

OTHER REFERENCES

Pages 76 and 77 of "Rotovalves," Bulletin No. 140, copyrighted 1939 by the S. Morgan Smith Co. of York, Pa. (Copy in Div. 39.)

UNITED STATES PATENT OFFICE
CERTIFICATE OF CORRECTION

Patent No. 3,005,647                                      October 24, 1961

Adolph Wolfensperger

It is hereby certified that error appears in the above numbered patent requiring correction and that the said Letters Patent should read as corrected below.

Columns 5 and 6, in the table, column 1, line 2 thereof, for "$\frac{A^2}{A^2}=3.66$" read -- $\frac{A_2}{A_1}=3.66$ --; column 7, line 1, before "angle" insert -- single --; line 4, for "thruogh" read -- through --.

Signed and sealed this 8th day of May 1962.

(SEAL)
Attest:

ERNEST W. SWIDER                                  DAVID L. LADD
Attesting Officer                                    Commissioner of Patents